United States Patent
Hartmann et al.

(10) Patent No.: US 10,137,517 B2
(45) Date of Patent: *Nov. 27, 2018

(54) NICKEL-BASED BRAZING FOIL AND PROCESS FOR BRAZING

(71) Applicant: Vacuumschmelze GmbH & Co. KG, Hanau (DE)

(72) Inventors: Thomas Hartmann, Altenstadt (DE); Dieter Nuetzel, Hainburg (DE)

(73) Assignee: VACUUMSCHMELZE GMBH & CO KG, Hanau (DE)

(*) Notice: Subject to any disclaimer, the term of this patent is extended or adjusted under 35 U.S.C. 154(b) by 53 days.

This patent is subject to a terminal disclaimer.

(21) Appl. No.: 15/082,338

(22) Filed: Mar. 28, 2016

(65) Prior Publication Data

US 2016/0207130 A1    Jul. 21, 2016

Related U.S. Application Data

(63) Continuation of application No. 12/285,754, filed on Oct. 14, 2008, now Pat. No. 9,757,810.
(Continued)

(30) Foreign Application Priority Data

Oct. 15, 2007   (DE) .................... 10 2007 049 508

(51) Int. Cl.
  *C22C 45/04*   (2006.01)
  *B23K 35/30*   (2006.01)
(Continued)

(52) U.S. Cl.
CPC ............ *B23K 1/0012* (2013.01); *B23K 1/19* (2013.01); *B23K 35/0233* (2013.01);
(Continued)

(58) Field of Classification Search
None
See application file for complete search history.

(56) References Cited

U.S. PATENT DOCUMENTS

| | | | |
|---|---|---|---|
| 3,986,867 A | 10/1976 | Masumoto et al. | |
| 4,116,682 A | 9/1978 | Polk et al. | |

(Continued)

FOREIGN PATENT DOCUMENTS

| | | | |
|---|---|---|---|
| DE | 2500846 A1 | 10/1975 | |
| DE | 2755435 A1 | 6/1978 | |

(Continued)

OTHER PUBLICATIONS

Board Decision dated Jan. 28, 2016 in U.S. Appl. No. 12/285,754.*
(Continued)

*Primary Examiner* — George Wyszomierski
(74) *Attorney, Agent, or Firm* — Dickinson Wright PLLC

(57) ABSTRACT

An amorphous, ductile brazing foil is provided. According to one example embodiment, the composition consists essentially of $Ni_{rest}Cr_aB_bP_cSi_d$ with 2 atomic percent$\leq a \leq$30 atomic percent; 0.5 atomic percent$\leq b \leq$14 atomic percent; 2 atomic percent$\leq c \leq$20 atomic percent; 0 atomic percent$\leq d \leq$14 atomic percent; incidental impurities$\leq$0.5 atomic percent; rest Ni, where $c > b > c/15$ and 10 atomic percent$\leq b+c+d \leq$25 atomic percent.

18 Claims, 2 Drawing Sheets

Related U.S. Application Data

(60) Provisional application No. 60/960,796, filed on Oct. 15, 2007.

(51) Int. Cl.

| | | |
|---|---|---|
| *B23K 1/00* | (2006.01) | |
| *B23K 35/02* | (2006.01) | |
| *C22C 1/00* | (2006.01) | |
| *C22C 19/05* | (2006.01) | |
| *C22F 3/00* | (2006.01) | |
| *F28F 21/08* | (2006.01) | |
| *F02M 26/29* | (2016.01) | |
| *B23K 1/19* | (2006.01) | |
| *C22F 1/00* | (2006.01) | |
| *C22F 1/10* | (2006.01) | |

(52) U.S. Cl.
CPC ........ *B23K 35/304* (2013.01); *B23K 35/3033* (2013.01); *C22C 1/002* (2013.01); *C22C 19/05* (2013.01); *C22C 19/058* (2013.01); *C22C 45/04* (2013.01); *C22F 1/002* (2013.01); *C22F 1/10* (2013.01); *C22F 3/00* (2013.01); *F02M 26/29* (2016.02); *F28F 21/083* (2013.01); *F28F 21/089* (2013.01); *Y10T 428/12944* (2015.01); *Y10T 428/12972* (2015.01)

(56) References Cited

U.S. PATENT DOCUMENTS

| | | | |
|---|---|---|---|
| 4,148,973 | A | 4/1979 | Sexton et al. |
| 4,326,572 | A | 4/1982 | Ingram et al. |
| 4,365,994 | A | 12/1982 | Ray |
| 4,385,944 | A | 5/1983 | Hasegawa |
| 4,745,037 | A | 5/1988 | DeCristofaro et al. |
| 4,834,806 | A | 5/1989 | Hashimoto et al. |
| 4,900,638 | A | 2/1990 | Emmerich |
| 5,486,391 | A | 1/1996 | Tyner |
| 5,496,391 | A | 3/1996 | Noel |
| 9,757,810 | B2 * | 9/2017 | Hartmann ............ B23K 1/0012 |
| 2004/0184945 | A1 | 9/2004 | Sjodin |
| 2011/0250470 | A1 | 10/2011 | Hartmann et al. |

FOREIGN PATENT DOCUMENTS

| | | |
|---|---|---|
| DE | 3011152 A1 | 10/1980 |
| DE | 3120169 C2 | 2/1982 |
| DE | 3120169 C2 | 9/1984 |
| DE | 3712271 A1 | 10/1988 |
| DE | 19610539 | 9/1997 |
| DE | 19610539 A1 | 9/1997 |
| DE | 102006049106 A1 | 6/2007 |
| EP | 0051461 A1 | 5/1982 |
| EP | 0096551 A2 | 12/1983 |
| GB | 844835 | 8/1960 |
| GB | 844835 A | 8/1960 |
| JP | 53057120 A | 5/1978 |
| JP | 63079931 | 4/1988 |
| JP | 63079931 A | 4/1988 |
| JP | 07054108 | 2/1995 |
| JP | 07054108 A | 2/1995 |
| JP | 2007075867 | 3/2007 |
| JP | 2007075867 A | 3/2007 |
| WO | 02098600 A1 | 12/2002 |

OTHER PUBLICATIONS

ASM Specialty Handbook: Nickel, Cobalt and Their Alloys, "Special-Purpose Nickel Alloys", pp. 92-105, ASM International, 2000.

Jensen, K.V. et al., "Effect of impurities on structural and electrochemical properties of the Ni—YSZ interface", Solid State Ionics, vol. 160, 2003, pp. 27-37.

"JIS Z 3265 Nickel Brazing Filler Metals," Japanese Industrial Standard, 1998, Japanese Standards Association, Tokyo, Japan (English translation).

"Brazing—Filler metals," European Standar EN 1044, May 1999, pp. 1-11, European Committee for Standardization, Brussels, Belgium (German language).

"Table 5—Chemical Composition Requirements for Nickel and Cobalt Filler Metals", SWS A5.8/A5.8M Specification for Filler Metals for Brazing and Braze Welding, 2004, American Welding Society, Miami, FL.

German Office Action dated Apr. 3, 2017 Regarding DE 10 2007 049 508.2.

\* cited by examiner

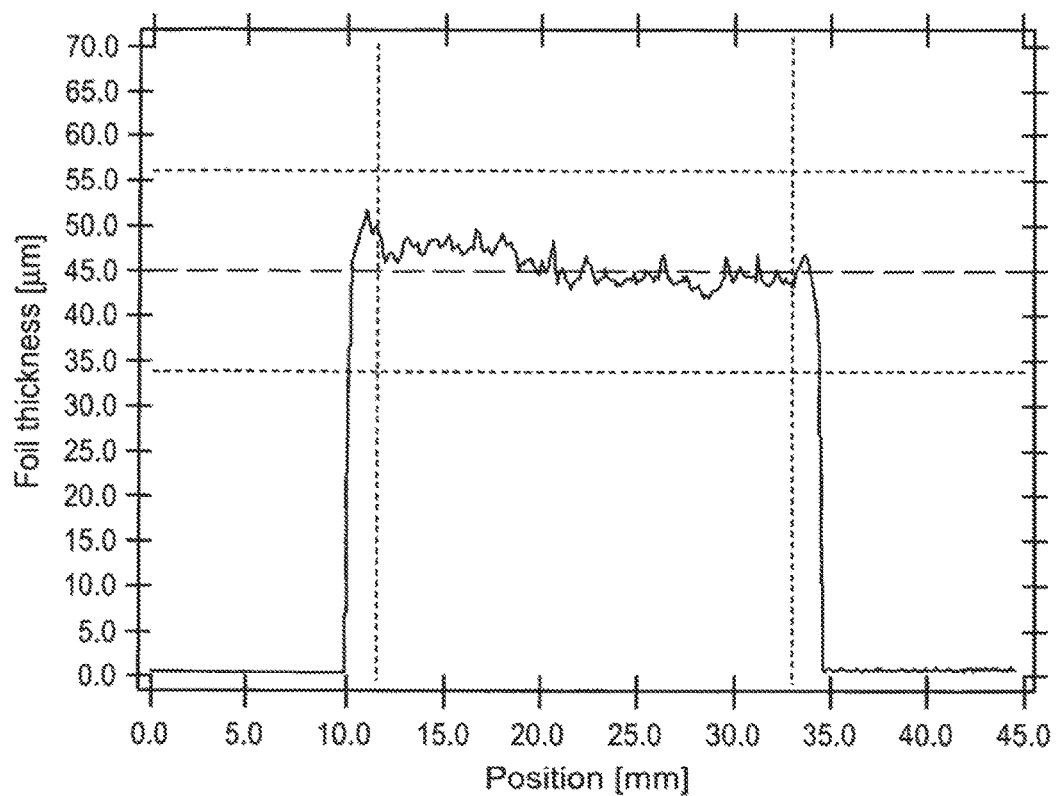

NICKEL-BASED BRAZING FOIL AND PROCESS FOR BRAZING

This U.S. continuation patent application claims benefit of the filing date of U.S. utility patent application Ser. No. 12/285,754, filed Oct. 14, 2008, now U.S. Pat. No. 9,757,810, which claims the benefit of U.S. Provisional Application Ser. No. 60/960,796, filed Oct. 15, 2007, the entire contents of which are hereby incorporated herein by reference.

BACKGROUND

1. Field

The invention relates to a nickel-based brazing foil and a process for brazing two or more parts.

2. Description of Related Art

Soldering is a process for joining metal or ceramic parts using a melted filler material referred to as solder. The melting temperature of the solder is lower than that of the parent metals to be joined, which are wetted but not melted by the solder. A characteristic property of solders is their low melting range, i.e. the range between the solidus temperature and the liquidus temperature, and the resulting processing temperatures which typically lie 10° C. to 50° C. above the liquidus temperature.

A distinction is made between soft soldering and hard soldering, or brazing, depending on the processing temperature of the solder. Soft solders are processed at temperatures below 450° C., whilst hard solders, or brazes, are processed at temperatures above 450° C. Brazes are used in applications in which high mechanical stability of the soldered joint and/or high mechanical stability at high operating temperatures is desired.

Parts made of stainless steel, and of Ni- and Co-alloys are frequently joined using Ni-based brazes. These Ni-based brazes may also have a certain chromium content which results in improved corrosion resistance. In addition they may contain the metalloid elements silicon, boron and phosphorus which result in a reduction in the melting temperature and consequently the processing temperature of the braze. These elements are also referred to as glass-forming elements.

Ni—Cr-braze alloys are typically available in the form of solder powders produced using atomizing processes, or in the form of solder pastes in which the atomized powders are mixed with organic binding agents and solvents.

When brazing using solder pastes, the binding agents and solvents are decomposed. This can lead to inadequate flow and wetting behavior and consequently to a poor joint. These problems can be avoided by using a braze in the form of a ductile foil, whereby a solder seam can be produced more reliably. Certain examples of Ni-based brazing foils which can be produced in the form of ductile foils are known from U.S. Pat. No. 4,316,572, for example. These ductile brazing foils can be produced by means of rapid solidification processes and are at least partially amorphous.

SUMMARY

It is, however, desirable to further reduce the costs of brazing foils and to further increase the reliability of the joints produced with brazing foils.

One advantage of embodiments of the invention disclosed herein is therefore to specify a nickel-based braze which can be produced as a ductile and at least partially amorphous foil at favorable cost.

Furthermore, the joints made with the brazing foil should be more reliable.

In one embodiment, the invention relates to an amorphous, ductile brazing foil with a composition consisting essentially of $Ni_{rest}Cr_aB_bP_cSi_d$ wherein a, b, c, and d are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; wherein incidental impurities are present, if at all, in amounts≤0.5 atomic percent; wherein rest indicates that the balance of the composition is Ni; wherein c>b>c/15, and wherein 10 atomic percent≤b+c+d≤25 atomic percent.

In another embodiment, the invention relates to an alternative amorphous, ductile brazing foil with a composition consisting essentially of $Ni_{rest}Cr_aB_bP_cSi_dC_eX_fY_g$ wherein a, b, c, d, e, f, and g are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; 0 atomic percent≤e≤5 atomic percent; 0 atomic percent≤f≤5 atomic percent; 0 atomic percent≤g≤20 atomic percent, wherein incidental impurities are present, if at all, in amounts≤0.5 atomic percent; wherein rest indicates that the balance of the composition is Ni; wherein c>b>c/15; wherein 10 atomic percent≤b+c+d≤25 atomic percent; and wherein X is one or more of the elements Mo, Nb, Ta, W and Cu; and wherein Y is one or both of the elements Fe and Co.

In another embodiment, the invention relates to a brazed object with a first part and a second part. The first part is joined by fusion to the second part by a solder seam produced using a brazing foil as according to one of the preceding embodiments. The object thus has a solder seam produced by means of a brazing foil as according to the invention. This brazed object may be a heat exchanger, in particular, an exhaust gas recirculation cooler or an oil cooler.

In another embodiment, the invention relates to processes for joining two or more parts of an object by fusion. In one particular embodiment of a process, a brazing foil according to one of the embodiments disclosed herein is inserted between two or more parts to be joined. The parts to be joined have a higher melting temperature than the brazing foil. The solder joint is heated to a temperature above the liquidus temperature of the braze and below the melting temperature of the two parts. The solder joint is then cooled between the parts to be joined, thereby forming a brazed joint.

In another embodiment, the invention relates to processes for producing an amorphous ductile brazing foil. In a first embodiment, a molten mass consisting essentially of $Ni_{rest}Cr_aB_bP_cSi_d$ wherein a, b, c, and d are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; wherein incidental impurities are present, if at all, in amounts≤0.5 atomic percent; wherein rest indicates that the balance of the molten mass is Ni, wherein c>b>c/15; and wherein 10 atomic percent<b+c+d≤25 atomic percent, is subjected to rapid solidification on a moving cooling surface with a cooling speed of more than approximately $10^{5}$° C./sec, to produce an amorphous, ductile brazing foil.

In a further embodiment of this process, an amorphous, ductile brazing foil is produced from a molten mass consisting essentially of $Ni_{rest}Cr_aB_bP_cSi_d$ wherein a, b, c, d, e, f, and g are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; 0 atomic percent≤e≤5 atomic percent; 0 atomic percent≤f≤5 atomic percent; 0 atomic percent≤g≤20 atomic percent; wherein incidental impurities are present, if at all, in amounts≤0.5 atomic percent; wherein rest indicates that the balance of the molten mass is Ni, wherein c>b>c/15; wherein 10 atomic percent≤b+c+d≤25 atomic percent, wherein X is one or more of the elements Mo, Nb, Ta, W and Cu, and wherein Y is one or both of the elements Fe and Co.

In a particular embodiment, the invention disclosed herein relates to a process for joining by fusion two or more parts comprising:

providing a molten mass consisting essentially of $Ni_{rest}$-$Cr_aB_bP_cSi_d$ wherein a, b, c, and d are numbers such that 2 atomic percent≤a≤atomic percent; 0.5 atomic percent≤b≤14 atomic percent; 2 atomic percent≤c≤20 atomic percent; 0 atomic percent≤d≤14 atomic percent; wherein incidental impurities are present, if at all, in amounts≤0.5 atomic percent; wherein rest indicates that the balance of the molten mass is Ni, wherein c>b>c/15; and wherein 10 atomic percent≤b+c+d≤25 atomic percent.

rapidly solidifying the molten mass on a moving cooling surface with a cooling speed of more than approximately $10^{5°}$ C./sec to produce an amorphous brazing foil;

inserting the amorphous brazing foil between the metal parts to be joined to form a solder joint;

heating the solder joint to a temperature above the liguidus temperature of the brazing foil to form a heated solder joint;

cooling of the heated solder joint to form a cooled solder joint between the metal parts to be joined.

In a further embodiment, this process for joining by fusion two or more parts comprises:

providing a molten mass consisting essentially of $N_{rest}$-$Cr_aB_bP_cSi_dC_eX_fY_g$ a, b, c, d, e, f, and g are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; 0 atomic percent≤e≤5 atomic percent; 0 atomic percent≤f≤5 atomic percent; 0 atomic percent≤g≤20 atomic percent; wherein incidental impurities are present, if at all, in an amount≤0.5 atomic percent; wherein rest indicates that the balance of the molten mass is Ni, wherein c>b>c/15; wherein 10 atomic percent≤b+c+d≤25 atomic percent; wherein X is one or more of the elements Mo, Nb, Ta, W and Cu; and wherein Y is one or both of the elements Fe and Co;

rapidly solidifying the molten mass on a moving cooling surface with a cooling speed of more than approximately $10^{5°}$ C./sec to form an amorphous brazing foil;

inserting the amorphous brazing foil between the metal parts to be joined to form a solder joint;

heating the solder joint to a temperature above the liquidus temperature of the brazing foil to form a heated solder joint;

cooling the heated solder joint to form a cooled solder joint between the metal parts to be joined.

The brazing foil described herein provides both the ability to produce a uniform, reliable geometry over significantly longer lengths than previously possible, while at the same time providing a brazing foil with good corrosion resistance.

BRIEF DESCRIPTION OF DRAWINGS

The invention is explained in greater detail below with reference to the drawings and certain non-limiting embodiments.

FIG. 2 is a graph showing thickness as a function of position across the sheet cross-section of a brazing foil according to an embodiment of the invention disclosed herein at a sheet length of 200 m.

DETAILED DESCRIPTION OF SPECIFIC EMBODIMENTS

Figure 1:
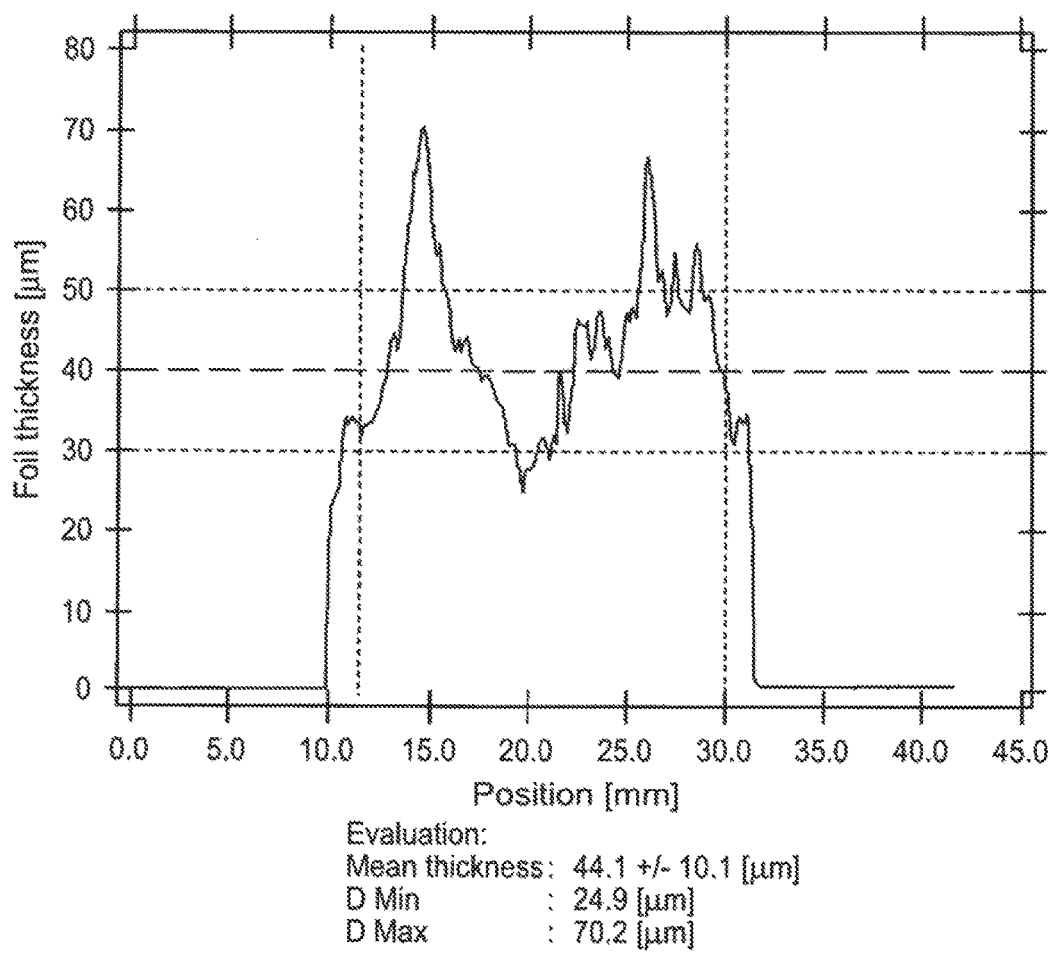
FIG. 1 is a graph showing foil thickness as a function of position across the sheet cross-section of a comparison foil at a sheet length of 200 m.

In the invention, the brazing foil contains the glass-forming elements P and B. In one embodiment the brazing foil is silicon-free and in an alternative embodiment the brazing foil contains silicon, the Si content being d, such that 0 atomic percent<d≤14 atomic percent.

In the invention, the phosphorus content c in atomic percent is greater than the boron content b in atomic percent, which is greater than the phosphorus content c in atomic percent divided by 15, i.e. c>b>c/15. The sum of the Si, P and B contents (c+d+e) lies within a range such that 10 atomic percent≤(c+d+e)≤25 atomic percent.

This sum of the metalloids Si, B and P, and the ratio between the P content and the B content of the nickel-based brazing foil according to the invention, specify a braze which can be produced as an at least partially amorphous, ductile foil in long lengths and with small geometrical variations along the length of the foil.

This increased length of the foil with little geometric variation along its length makes it possible to reduce production costs. In addition, the reliability of the solder seams produced with the brazing foil is increased because the geometry of the foil is uniform.

Known Ni—Cr—P-based braze alloys such as those described as solder materials NI107 and NI112 in DIN EN 1044 (Filler metals) and as BNi-7 and BNi-12 in US AWS A5.8M5.8M:2004 (Specification for Filler Metals for Brazing and Braze Welding) cannot reliably be produced as amorphous foils with continuously stable geometry over long lengths in a mass production context. This is because hard phases which interfere with the casting process can be precipitated during production of the amorphous Ni—Cr—P foils.

As solid particles these hard phases damage the casting nozzle and thereby interfere with sheet production and have a negative influence on geometric sheet quality.

As a result, sheet quality deteriorates continuously as the casting process progresses, and it is impossible to take counter-measures during casting. This means that the casting process must be interrupted after a short period in order to clean and overhaul the casting nozzle. Each time the casting process is interrupted, the continuous amorphous foil is broken, making it impossible to produce long amorphous foil strips.

This is undesirable since an economic production process and the possibility of further industrial processing require foils of this type, i.e. foils with lengths of more than 100 m (meters) and which maintain a stable foil geometry along their entire lengths. Furthermore, processing short foil pieces of less than approx. 100 m in length is disadvantageous in the further machining of the foils.

The variations and irregularities which can occur with the known Ni—Cr—P-based brazing foils are also disadvantageous in terms of the further industrial use of the brazing foils, since the amount of solder supplied to the joint is determined primarily by the foil thickness. Large variations in solder quantity can lead to variations in the soldering result, which can in turn lead to the failure of components.

The problems of short lengths and large geometrical variations can be avoided by means of the compositions according to the embodiments of the invention. It is found that a small boron content in an Ni—Cr—P-based alloy based on the c>b>c/15 rule permits the production of amorphous foils with stable sheet geometry over long lengths. The alloys according to the 35 invention also have a liquidus temperature of below 1080° C. and good corrosion resistance due to the Cr content.

The composition according to the invention does not have the aforementioned disadvantages of significant geometrical variations since the use of the relative proportions of the P, B and C content according to the embodiments of the disclosed invention suppresses the formation of damaging hard phases.

By using the alloy composition disclosed herein, it is possible to produce continuous foil lengths of several thousand meters which have only very small fluctuations in thickness of less than 20% of nominal sheet thickness. In addition, the brazing foils according to the invention have a liquidus temperature of less than 1080° C. and can thus be processed at temperatures of under 1100° C. It is possible to maintain the sheet quality within the desired quality criteria even at these foil lengths.

The amorphous, ductile brazing foil according to the invention can thus be produced in long lengths with small geometrical variations. This provides the economic advantages described above, and is advantageous in the further processing of the brazing foil.

The further processing of amorphous brazing foils typically takes the form of slitting, cross-cutting, continuous etching, stamping or laminating. These further processes require the provision of long foil lengths of stable geometry in order to fulfil economic requirements. These requirements can be met with the brazing foil according to the invention.

Amongst other techniques, soldering applications for amorphous brazing foils involve winding the foil around a long cooling pipe in order to solder the pipe continuously to a continuous spiral cooling fin around its periphery. These pipes, up to 30 m in length, are used as cooling pipes in steam generators, for example.

In industrial applications such as this one it is desirable to provide continuous foil lengths of more than 100 m which have a stable foil geometry in order to be able to apply a fixed layer of solder continuously to such long pipes. In general, industrial assembly processes also benefit from, or require, the use of long foil lengths in order to avoid frequent and uneconomic downtimes of machines in the assembly plant.

These requirements can also be met with the brazing foil according to the invention.

In one embodiment the brazing foil has a Cr content a, such that 16 atomic percent<a≤30 atomic percent. This higher chromium content provides a brazing foil with improved corrosion resistance. Such a brazing foil can be used for applications involving corrosive media. For example, this brazing foil with its higher Cr content can be used in motor vehicle exhaust gas recirculation systems.

The reduction of emission values in motor vehicle construction leads to an increased demand for corrosion-resistant soldered joints using stainless steels such as, for example, DIN EN 1.4404 or 1.4539 to resist sulphurous, nitrous and high-chloride media.

In applications in which the components require very high corrosion resistance, such as EGR (Exhaust Gas Recirculation) coolers for the motor vehicle industry, for example, the formation of coarse grains is undesirable since in addition to reducing mechanical properties it also reduces the corrosion resistance of the components. For this reason it is, in addition, desirable to achieve a soldering temperature of below 1100° C.

In further embodiments the brazing foil has a B content b, such that 1 atomic percent≤b≤8 atomic percent and/or a P content c, such that 5 atomic percent≤c≤18 atomic percent.

In further embodiments, the brazing foil can contain one or more of the elements Mo, Nb, Ta, W or Cu. In these embodiments, the content f of this element/these elements may be in the range 0 atomic percent<f≤3 atomic percent, more particularly within the range 0 atomic percent<f≤3 atomic percent.

In further embodiments, the brazing foil can contain one or more of the elements Fe or Co. In these embodiments, the content g of this element/these elements may be within the range 0 atomic percent≤g≤5 atomic percent, more particularly within the range 0 atomic percent<g≤5 atomic percent, even more particularly 0 atomic percent<g≤1 atomic percent, even more particularly 0 atomic percent<g≤1 atomic percent.

The brazing foil according to any of the preceding embodiments may contain silicon or be silicon-free, i.e. may have a Si content d, such that 0 atomic percent<d≤14 atomic percent or a Si content d, such that d=0 atomic percent.

In one embodiment the brazing foil is at least 50% amorphous, preferably at least 80% amorphous.

In certain embodiments, the brazing foils can have a thickness D of 15 µm≤D<75 µm. Furthermore, they may have a width B, such that 0.5 mm≤B≤300 mm or a width B, such that 30 mm≤B≤150 mm. The brazing foils according to the invention can thus be produced in dimensions appropriate for a plurality of applications.

The brazing foil according to the invention can be produced in lengths of several thousand meters. This has the advantage that the production costs can be reduced since this increases the quantity of brazing foil which has small geometrical variation and which can be produced from one casting run.

The brazing foil can also be produced reliably with small thickness variations. In further embodiments the brazing foil has a thickness variation from the mean thickness of less than 20% over a length of 100 m, a thickness variation of less than 25% over a length of 200 m and a thickness variation of less than 10% over a length of 5000 m. In a further embodiment the foil has a thickness variation of less than 15 pm over a length of 100 m. These foils fulfil the criteria set out in AWS A5.8.

Thus, in further embodiments the brazing foil has a length L of at least 200 m with a thickness variation of less than 25% over the length of the foil. In a particular embodiment, the brazing foil has a length L of at least 5000 m with a thickness variation of less than 10% over the length of the foil. The brazing foil is provided in the form of a sheet which can be cut up in order to create a plurality of smaller foils of the desired size and/or shape.

This uniform geometry is advantageous since the solder seams produced from the foil are reliable. Variations in thickness can lead to gaps in the solder seam and consequently to an unreliable joint. This problem can be avoided since the brazing foil according to the invention has small thickness variations.

In particular embodiments, the brazing foils have a liquidus temperature of less than 1100° C., less than 1080° C. and less than 1050° C. respectively. This is desirable because the maximum soldering temperature for many industrial soldering processes, in particular for joining stainless steel parent metals, is limited to approximately 1200° C. As a general rule, the lowest possible soldering temperature is best because undesirable coarse grain formation takes place in the parent metal from a temperature of 1000° C. This undesirable coarse grain formation leads to a reduction in the mechanical stability of the parent metal. This mechanical stability is critical for many technical applications, such as heat exchangers, for example.

In a further embodiment, the invention also relates to a brazed object with a first part and a second part. The first part is joined by fusion to the second part by a solder seam produced using a brazing foil as according to one of the preceding embodiments. The object thus has a solder seam produced by means of a brazing foil as according to the invention.

For example, in a particular embodiment this brazed object could be a heat exchanger, such as an exhaust gas recirculation cooler, or an oil cooler. The brazed object, such as the heat exchanger described above, has a first part and a second part in which the first part is joined by fusion to the second part by a solder seam produced using a brazing foil as according to one of the preceding embodiments.

In a particular embodiment, the first part and the second part of the brazed object can be made of a stainless steel. The stainless steel may, for example, be an austenitic stainless steel or have ferritic or mixed joints. Alternatively, the parts may be made of a Ni-alloy or a Co-alloy.

The solder seam located between the parts may have a thickness of more than 15 μm.

In a further embodiment, the invention also relates to processes for joining two or more parts by fusion. In one process a brazing foil according to one of the embodiments described herein is inserted between two or more parts to be joined. The parts to be joined have a higher melting temperature than the brazing foil. The solder joint is heated to a temperature above the liquidus temperature of the braze and below the melting temperature of the two parts. The solder joint is then cooled between the parts to be joined, thereby forming a brazed joint.

The parts to be joined by the processes described herein may be parts of a heat exchanger or an exhaust gas recirculation cooler or an oil cooler or components of a heat exchanger or an exhaust gas recirculation cooler or an oil cooler.

In another embodiment, the invention relates to processes for producing an amorphous ductile brazing foil. In a first embodiment, a molten mass consisting essentially of $Ni_{rest}Cr_aB_bP_cSi_d$ wherein a, b, c, and d are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; incidental impurities are present, if at all, in amounts≤0.5 atomic percent; rest indicates that the balance of the molten mass is Ni, where c>b>c/15 and 10 atomic percent≤b+c+d≤25 atomic percent, is subjected to rapid solidification on a moving cooling surface with a cooling speed of more than approximately $10^{5°}$ C./sec, to produce an amorphous, ductile brazing foil.

In a further embodiment of this process, an amorphous, ductile brazing foil is produced from a molten mass consisting essentially of $Ni_{rest}Cr_aB_bP_cSi_dC_eX_fY_g$ wherein a, b, c, d, e, f, and g are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; 0 atomic percent≤e≤5 atomic percent; 0 atomic percent≤f≤5 atomic percent; 0 atomic percent≤g≤20 atomic percent, incidental impurities are present, if at all, in amounts≤0.5 atomic percent; rest indicates that the balance of the molten mass is Ni, where c>b>c/15 and 10 atomic percent≤b+c+d≤25 atomic percent, and where X is one or more of the elements Mo, Nb, Ta, W and Cu, and Y is one or both of the elements Fe and Co.

In a particular embodiment, the invention disclosed herein relates to a process for joining by fusion two or more parts comprising:

providing a molten mass consisting essentially of $Ni_{rest}Cr_aB_bP_cSi_d$ wherein a, b, c, and d are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; incidental impurities are present, if at all, in amounts≤0.5 atomic percent; rest indicates that the balance of the molten mass is Ni, where c>b>c/15 and atomic percent≤b+c+d≤25 atomic percent.

rapidly solidifying the molten mass on a moving cooling surface with a cooling speed of more than approximately $10^{5°}$ C./sec to produce an amorphous brazing foil;

inserting the amorphous brazing foil between the metal parts to be joined to form a solder joint; heating the solder joint to a temperature above the liquidus temperature of the brazing foil to form a heated solder joint;

cooling of the heated solder joint to form a cooled solder joint between the metal parts to be joined.

A further process for joining by fusion two or more parts comprises:

providing a molten mass consisting essentially of $Ni_{rest}Cr_aB_bP_cSi_dC_eX_fY_g$ wherein a, b, c, d, e, f, and g are numbers such that 2 atomic percent≤a≤30 atomic percent; 0.5 atomic percent≤b≤14 atomic percent; 2 atomic percent≤c≤20 atomic percent; 0 atomic percent≤d≤14 atomic percent; 0 atomic percent≤e≤5 atomic percent; 0 atomic percent≤f≤5 atomic percent; 0 atomic percent≤g≤20 atomic percent, incidental impurities are present, if at all, in an amount≤0.5 atomic percent; rest indicates that the balance of the molten mass is Ni, where c>b>c/15 and 10 atomic percent≤b+c+d≤25 atomic percent, and where X is one or more of the elements Mo, Nb, Ta, W and Cu, and Y is one or both of the elements Fe and Co;

rapidly solidifying the molten mass on a moving cooling surface with a cooling speed of more than approximately $10^{5°}$ C./sec to form an amorphous brazing foil;

inserting the amorphous brazing foil between the metal parts to be joined to form a solder joint;

heating the solder joint to a temperature above the liquidus temperature of the brazing foil to form a heated solder joint;

cooling the heated solder joint to form a cooled solder joint between the metal parts to be joined.

In one embodiment the heating of the solder joint to a temperature above the liquidus temperature of the brazing foil is carried out in inert gas. This simplifies the soldering process, as the use of a vacuum furnace can be avoided. In particular, the use of a vacuum furnace to carry out the soldering process can be avoided if the processing temperature is below 1100° C.

In a further embodiment the heating of the solder joint to a temperature above the liquidus temperature of the brazing foil is carried out in a continuous furnace. This process is simplified if it can be carried out in inert gas. The use of a continuous furnace has the advantage that the soldering process can be carried out continuously. This reduces the time lost during the process.

The invention describes an amorphous, ductile brazing foil which has a composition consisting essentially of $Ni_{rest}Cr_aB_bP_cSi_d$ wherein a, b, c, and d are numbers such that 2 atomic percent$\leq$a$\leq$30 atomic percent; 0.5 atomic percent$\leq$b$\leq$14 atomic percent; 2 atomic percent$\leq$c$\leq$20 atomic percent; 0 atomic percent$\leq$d$\leq$14 atomic percent; incidental impurities are present, if at all, in amounts$\leq$0.5 atomic percent; and rest indicates that the balance of the composition is Ni.

The brazing foil contains the glass-forming elements P and B, the phosphorus content c in atomic percent being greater than the boron content b in atomic percent which is greater than the phosphorus content c in atomic percent divided by 15, i.e. c>b>c/15. Furthermore the content of the glass-forming elements P and B, and Si, in the event that it is used as a third glass-forming element, is in the region of 10 atomic percent$\leq$b+c+d$\leq$25 atomic percent.

Brazing foils with this composition can be produced in sheet lengths of over 200 m with small thickness variations.

The compositions of the brazing foils according to the invention and the compositions of comparison brazing foils are detailed in Table 1. The liquidus temperature and $L_{max}$ value of the various brazing foil sheets are also given in Table 1.

The value $L_{max}$ describes the foil length which can be produced as a continuous sheet without interruption with the absolute minimum and maximum geometric variations from the mean sheet thickness not exceeding 25%.

The foils are produced in the form of sheets by means of rapid solidification technology. To produce the sheets, a molten mass of the desired composition is prepared. The molten mass is rapidly solidified on a moving cooling surface with a cooling speed of over approximately $10^{5\circ}$ C./sec in order to produce an amorphous, ductile foil sheet.

Alloys 1 to 5 and 12 in Table 1 are comparison alloys and are not according to the invention.

Alloys 1 to 3 each contain P but not B as the glass-forming element, and alloys 4 and 5 each contain P and Si but not B as glass-forming elements. Alloy 12 contains P, B and Si. However, alloy 12 has a Cr content of 32 atomic percent which is above the maximum limit of the brazing foil according to the invention.

Alloys 1, 2, 4, 5 and 12 each have a value $L_{max}$ of 50 m or less. These alloys do not permit the production of a brazing foil of the commercially desired length with the desired stable geometry.

Alloy 3 is produced with a value $L_{max}$ of 5000 m, but has no Cr content. Consequently the corrosion resistance of this alloy is insufficient for many applications. Alloy 3 is not according to the invention.

Alloys 6 to 11 and 13 to 22 are according to the invention.

Alloy 6 has a composition of $Ni_{rest}Cr_{20}B_4P_{10}Si_7$, a liquidus temperature of 1010° C. and $L_{max}$ of 2000 m. Alloy 7 has a composition of $Ni_{rest}Cr_{20}B_8P_{10}$, a liquidus temperature of 1020° C. and $L_{max}$ of 5000 m. Alloy 8 has a composition of $Ni_{rest}Cr_{16}B_4P_9Si_7Mo_{01}Cu_1$, a liquidus temperature of 1050° C. and $L_{max}$ of 5000 m. Alloy 9 has a composition of $Ni_{rest}Cr_{20}B_3P_{10}Si_8Fe_{10}$, a liquidus temperature of 1020° C. and $L_{max}$ of 4000 m. Alloy 10 has a composition of $Ni_{rest}Cr_{16.5}B_3P_{17.1}$, a liquidus temperature of 890° C. and $L_{max}$ of 5000 m. Alloy 11 has a composition of $Ni_{rest}Cr_{20}B_4P_9Si_7Co_{10}$, a liquidus temperature of 895° C. and $L_{max}$ of 5000 m. Alloy 13 has a composition of $Ni_{rest}Cr_{20}B_4P_9Si_7Co_{10}$, a liquidus temperature of 1050° C. and $L_{max}$ of 4000 m. Alloy 14 has a composition of $Ni_{rest}Cr_{14}B_{1.2}P_{17}$, a liquidus temperature of 900° C. and $L_{max}$ of 5000 m. Alloy 15 has a composition of $Ni_{rest}Cr_{17}B_3P_{10}Si_8Si_{10}$, a liquidus temperature of 1025° C. and $L_{max}$ of 3000 m. Alloy 15 has a composition of $Ni_{rest}Cr_{18}B_4P_{17}$, a liquidus temperature of 930° C. and $L_{max}$ of 5000 m. Alloy 17 has a composition of $Ni_{rest}Cr_{18}B_{2.5}P_{13}Si_3$, a liquidus temperature of 980° C. and $L_{max}$ of 5000 m. Alloy 18 has a composition of $Ni_{rest}Cr_{18}B_{2.5}P_{13}Si_3Cu_4$, a liquidus temperature of 990° C. and $L_{max}$ of 5000 m. Alloy 19 has a composition of $Ni_{rest}Cr_{18}B_{2.5}P_{13}Si_3Mo_1$, a liquidus temperature of 1010° C. and $L_{max}$ of 5000 m. Alloy 20 has a composition of $Ni_{rest}Cr_{20}B_{2.5}P_{14}$, a liquidus temperature of 1000° C. and $L_{max}$ 20 of 5000 m. Alloy 21 has a composition of $Ni_{rest}Cr_{22}B_{2.5}P_{14}$, a liquidus temperature of 1000° C. and $L_{max}$ of 5000 m. Alloy 22 has a composition of $Ni_{rest}Cr_{22}B_{2.5}P_{13}Si_3$, a liquidus temperature of 1010° C. and $L_{max}$ of 5000 m.

In the invention the brazing foil contains Cr, P and B, the elements P and B each having a content c and b, respectively, in atomic percent selected such that c>b>c/15. Furthermore, the sum of the content of the glass-forming elements Si, P and B lies in the range 10 atomic percent$\leq$b+c+d$\leq$25 atomic percent.

This percentage of glass-forming elements and the ratio between the P and the B content permits the production of sheets in long lengths with small geometric variations. $L_{max}$ is thus increased. Without wishing to be bound by any theory, it is believed that the formation of brittle hard phases is suppressed during rapid solidification of melts having the recited compositions, so that it is possible to produce the foil sheet in long lengths with small thickness variations using the compositions and techniques described herein.

Alloys 6 to 11 and 13 to 22 in Table 1 fulfil these criteria and are according to the invention. The table indicates that the alloys according to the invention are produced in the form of sheets each with a value $L_{max}$ of 2000 m or more. Alloys, 7, 8, 10, 11, 14 and 16 to 22 are each produced with a value $L_{max}$ of 5000 m, the ends of which are constitutional.

Alloys 7, 10, 11, 14, 16, 20 and 21 each have P and B as glass-forming elements and are silicon-free. Alloys 6, 15, 17 to 19 and 22 each have P, B and Si as glass-forming elements.

In addition to the glass-forming elements, alloys 6, 7, 10 and 11 contain only Ni and Cr and no further elements. In addition to the glass-forming elements, alloy 8 contains Ni, Cr, 1 atomic percent Mo and 1 atomic percent Cu. In addition to the glass-forming elements, alloy 9 contains Ni, Cr and 10 atomic percent Fe. In addition to the glass-forming elements, alloy 13 contains Ni, Cr and 10 atomic percent Co. These alloys each have a value $L_{max}$ of 2000 m or more. In addition to the glass-forming elements, alloy 18 contains Ni, Cr and 4 atomic percent Cu. In addition to the glass-forming elements, alloy 19 contains Ni, Cr and 1 atomic percent Mo.

FIG. 1 shows a thickness measurement across the sheet cross section of comparative alloy 1 in Table 1 at a sheet length of 200 m. The variations in minimum and maximum sheet thickness from the mean value are shown in the figure. FIG. 1 illustrates that in this example the variations are above 50%. Such variations are undesirable for mass produced products and also unacceptable for many applications.

FIG. 2 shows a thickness measurement across the foil cross section of alloy as according to the invention 10 at a sheet length of 200 m. FIG. 2 illustrates that the variations in minimum and maximum sheet thicknesses from the mean value lie below 10%. The variations in thickness of the brazing foil according to the invention are much smaller than the variations in thickness measured with comparative alloy 1 shown in FIG. 1. The foil geometry of the brazing foil according to the invention is more uniform over long sheet lengths.

The more uniform foil geometry over the length of the brazing foil length is economically desirable for the reasons given above.

The invention has been described herein with reference to certain specific embodiments, which are intended to be illustrative and aid in understanding the invention, and are not intended to be limiting of the scope of the appended claims.

The invention claimed is:

1. An amorphous, ductile Ni-based brazing foil having a composition consisting essentially of

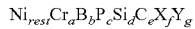

$Ni_{rest}Cr_aB_bP_cSi_dC_eX_fY_g$ wherein a, b, c, d, e, f, and g are numbers such that 16 atomic percent≤a≤30 atomic percent; 0.5 atomic percent≤b≤14 atomic percent; 2 atomic percent≤c≤20 atomic percent; 0 atomic percent≤d≤14 atomic percent; 0 atomic percent≤e≤5 atomic percent; 0 atomic percent<f≤3 atomic percent; 0 atomic percent<g≤5 atomic percent; wherein incidental impurities are present, if at all, in amounts≤0.5 atomic percent; wherein rest indicates that the balance of the composition is Ni; wherein c>b>c/15; wherein 10 atomic percent≤b+c+d≤25 atomic percent, wherein X is one or more of the elements Mo, Nb, Ta, W and Cu; and wherein Y is one or both of the elements Fe and Co, and wherein the foil varies in thickness from a mean thickness of the foil in a variation of less than 25% over a length of 200 m, the foil has a width B of 0.5 mm≤B≤300 mm, and the brazing foil is at least 50% amorphous.

2. The amorphous, ductile brazing foil in accordance with claim 1, wherein the B content b is such that 1 atomic percent≤b≤8 atomic percent.

3. The amorphous, ductile brazing foil in accordance with claim 1, wherein the P content c is such that 5 atomic percent≤c≤18 atomic percent.

4. The amorphous, ductile brazing foil in accordance with claim 1, wherein the Si content d is such that d=0 atomic percent.

5. The amorphous, ductile brazing foil in accordance with claim 1, wherein the Si content d is such that 0 atomic percent<d≤14 atomic percent.

6. The amorphous, ductile brazing foil in accordance with claim 1, wherein the Y content g is 0 atomic percent≤g≤1 atomic percent.

7. The amorphous, ductile brazing foil in accordance with claim 1, wherein the brazing foil is at least 80% amorphous.

8. The amorphous, ductile brazing foil in accordance claim 1, wherein the foil has a thickness D of 15 μm≤D≤75 μm.

9. The amorphous, ductile brazing foil in accordance with claim 1, wherein the width B is 30 mm≤B≤150 mm.

10. The amorphous, ductile brazing foil in accordance with claim 1, wherein the foil varies in thickness from a mean thickness of the foil in a variation of less than 20% over a length of 100 m.

11. The amorphous, ductile brazing foil in accordance with claim 1, wherein the foil varies in thickness from a mean thickness of the foil in a variation of less than 10% over a length of 5000 m.

12. The amorphous, ductile brazing foil in accordance with claim 1, wherein the foil varies in thickness from a mean thickness of the foil in a variation of less than 15 μm over a length of 100 m.

13. A brazed object having a first part joined to a second part by a solder seam produced by heating the brazing foil of claim 2.

14. The brazed object in accordance with claim 13, wherein both the first part and the second part are made of a stainless steel.

15. The brazed object in accordance with claim 14, wherein the solder seam has a thickness that is >15 μm.

16. The brazed object in accordance with claim 14, wherein the brazed object is a heat exchanger.

17. The brazed object of claim 16, wherein the heat exchanger is an exhaust gas recirculation cooler or an oil cooler.

18. The brazed object of claim 15, wherein the brazed object is a heat exchanger.

* * * * *